United States Patent
Tanaka

(10) Patent No.: US 9,531,905 B2
(45) Date of Patent: Dec. 27, 2016

(54) SCANNER THAT IS CAPABLE OF UPLOADING SCAN DATA IN A TARGET AREA WITHIN A DATA STORAGE SERVER

(71) Applicant: BROTHER KOGYO KABUSHIKI KAISHA, Nagoya-shi, Aichi-ken (JP)

(72) Inventor: Satoshi Tanaka, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/936,304

(22) Filed: Nov. 9, 2015

(65) Prior Publication Data

US 2016/0134778 A1 May 12, 2016

(30) Foreign Application Priority Data

Nov. 11, 2014 (JP) ................................. 2014-228900

(51) Int. Cl.
*H04N 1/21* (2006.01)
*H04L 29/08* (2006.01)
*H04N 1/00* (2006.01)

(52) U.S. Cl.
CPC .......... *H04N 1/217* (2013.01); *H04L 67/1097* (2013.01); *H04N 1/00214* (2013.01); *H04N 1/00244* (2013.01); *H04N 2201/0094* (2013.01)

(58) Field of Classification Search
None
See application file for complete search history.

(56) References Cited

U.S. PATENT DOCUMENTS

| 2011/0019216 A1* | 1/2011 | Kataoka | H04N 1/00222 358/1.13 |
| 2012/0005307 A1* | 1/2012 | Das | G06F 17/30138 709/219 |
| 2013/0033721 A1 | 2/2013 | Miyamoto | |

FOREIGN PATENT DOCUMENTS

JP 2013-033422 A 2/2013

* cited by examiner

*Primary Examiner* — Thomas D Lee
(74) *Attorney, Agent, or Firm* — Merchant & Gould P.C.

(57) ABSTRACT

A scanner may perform: determining whether a target area within a data storage server is in a first type of storage area or in a second type of storage area, the first type of storage area being a storage area in which uploaded data can be accessed by using whichever of a first and a second access method, and the second type of storage area being a storage area in which uploaded data can be accessed by using the first access method but not the second access method; uploading scan data in the target area in the first type of storage area in a case where it is determined that the target area is in the first type of storage area; and informing the user of impossible designation information in a case where it is determined that the target area is in the second storage area.

14 Claims, 5 Drawing Sheets

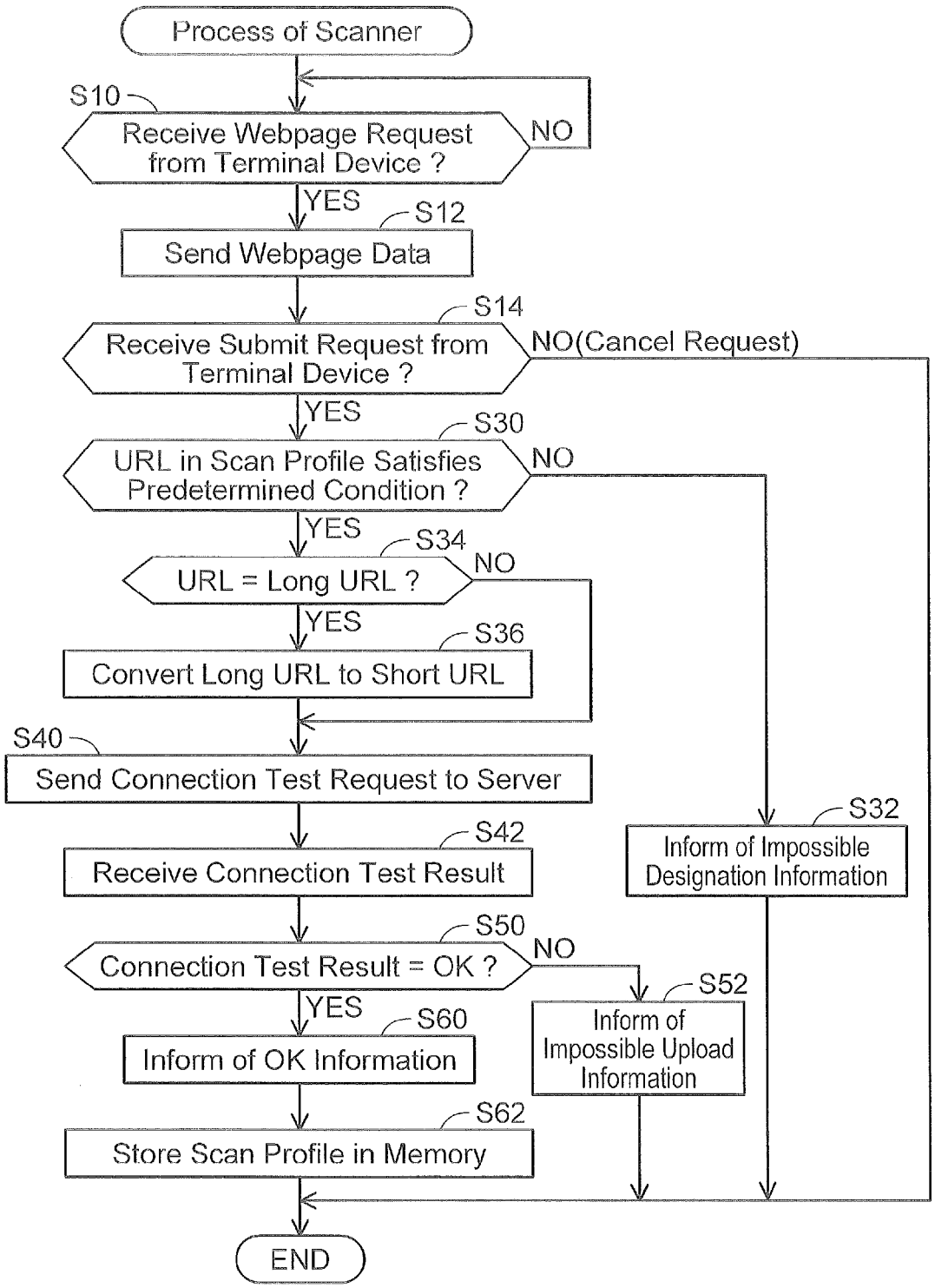

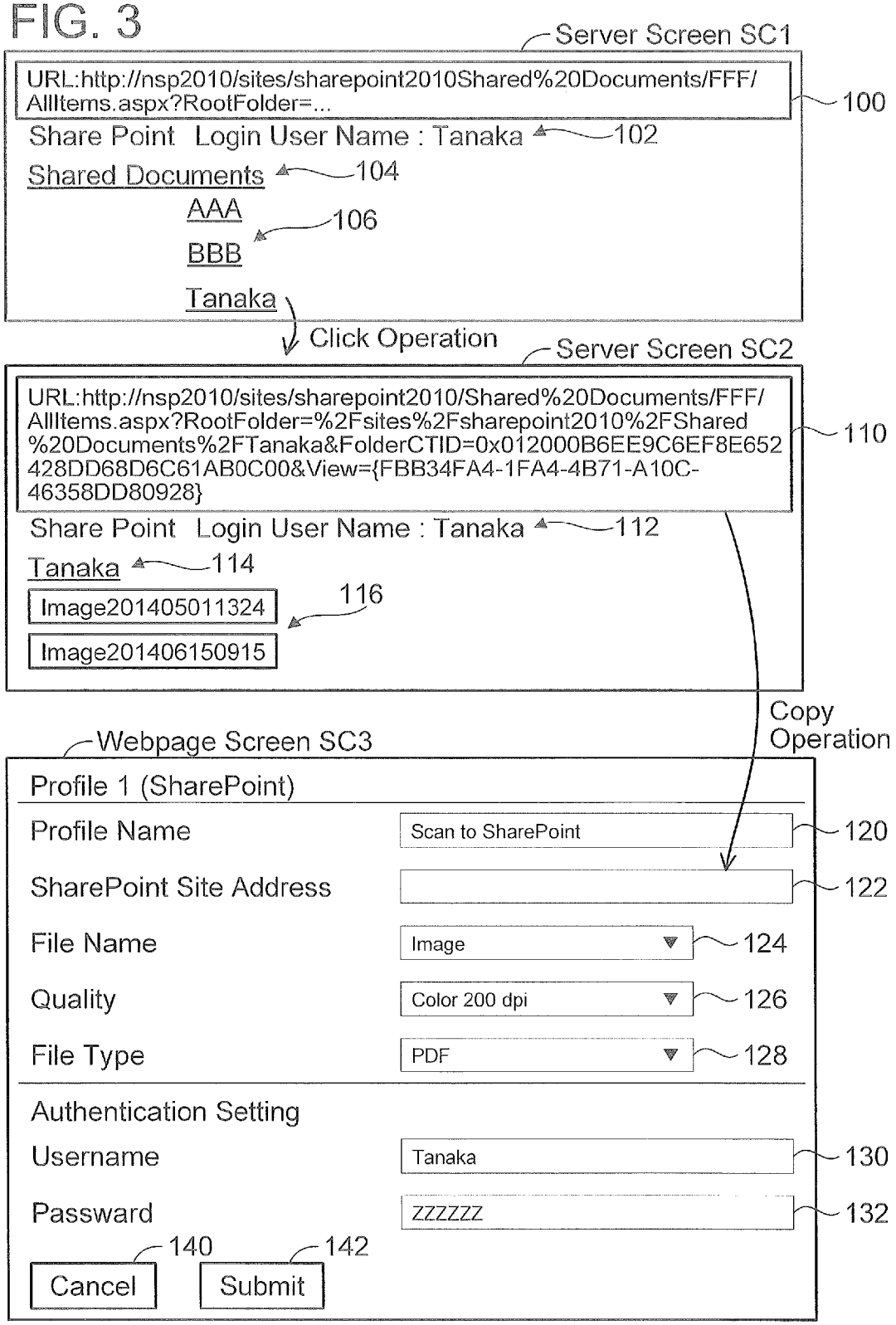

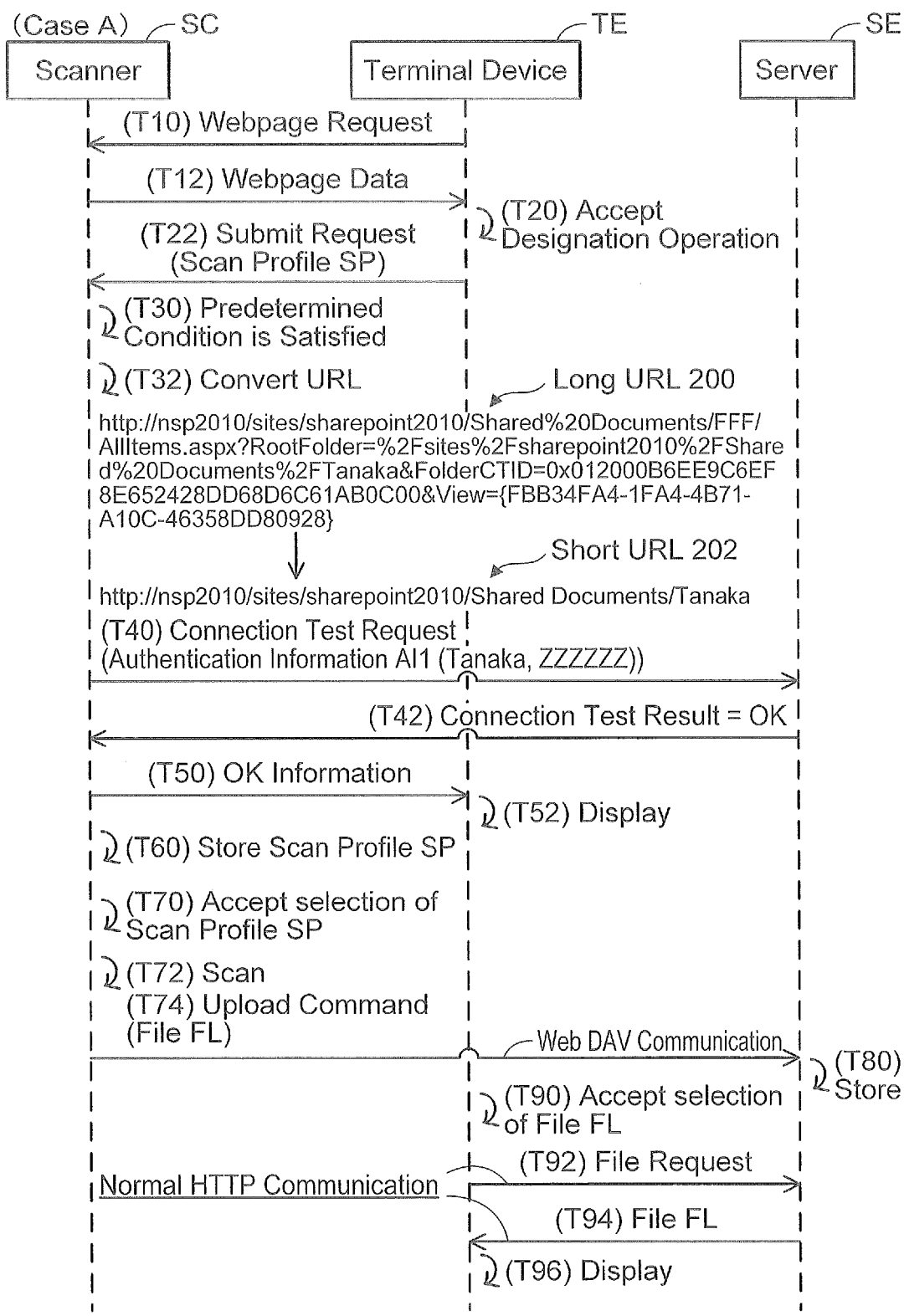

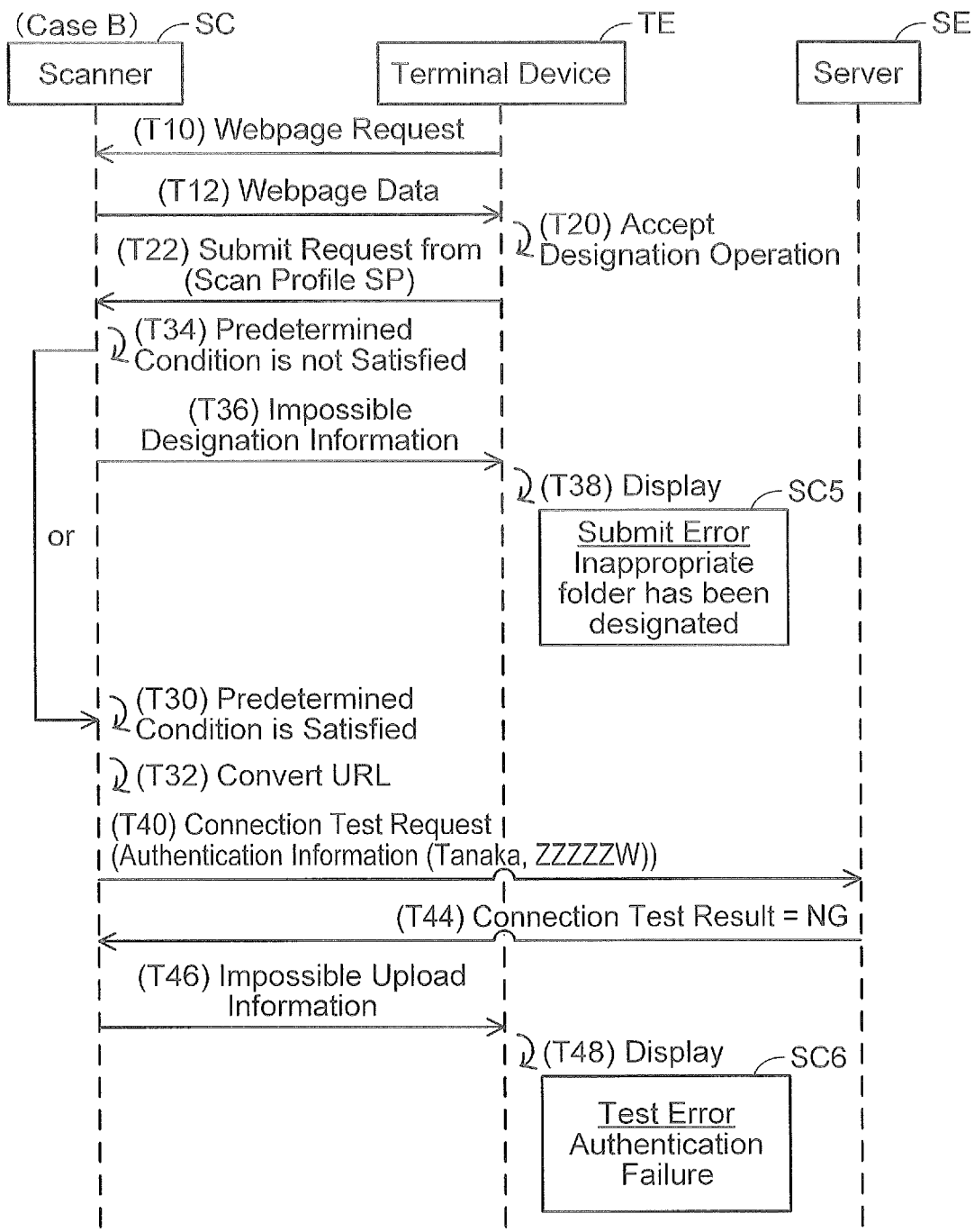

SCANNER THAT IS CAPABLE OF UPLOADING SCAN DATA IN A TARGET AREA WITHIN A DATA STORAGE SERVER

CROSS-REFERENCE TO RELATED APPLICATION

This application claims priority to Japanese Patent Application No. 2014-228900, filed on Nov. 11, 2014, the contents of which are hereby incorporated by reference into the present application.

TECHNICAL FIELD

The present specification discloses a technique related to a scanner that is capable of uploading scan data in a target area within a data storage server.

DESCRIPTION OF RELATED ART

An image forming device that sends scan data to a file server using protocols such as File Transfer Protocol (FTP), Server Message Block (SMB), Web-based Distributed Authoring and Versioning (WebDAV), and the like is known. Further, as an example of such a file server, a SharePoint (registered trademark) server of Microsoft (registered trademark) is known.

SUMMARY

As described above, in general, there is a plurality of access methods for accessing a data storage server (e.g., FTP, SMB, WebDAV, and the like). However, access to all of areas within the data storage server may not be achieved even if all of the plurality of above access methods is used. For example, a particular area within the data storage server may be accessed using a first access method, however it may not be accessed using a second access method. In such a case, for example, if a scanner uses the first access method to upload scan data to the particular data within the data storage server, a consequence as follows may occur. That is, for example, the scan data cannot be accessed even if a user attempts to access the scan data in the particular area by using the second access method from a terminal device such as a PC and the like.

In the present specification, a technique that may suppress an occurrence of a phenomenon in which scan data uploaded to a data storage server cannot be accessed is provided.

A scanner taught in the present specification may comprise a processor; and a memory that stores computer-readable instructions therein, the computer-readable instructions, when executed by the processor, causing the scanner to perform: determining by using first location information, in a case where the first location information indicating a target area within a data storage server is designated by a user, whether the target area is an area in a first type of storage area or an area in a second type of storage area different from the first type of storage area, the first type of storage area being a storage area in which data uploaded in the storage area can be accessed by using whichever of a first access method and a second access method being different from the first access method, and the second type of storage area being a storage area in which data uploaded in the storage area can be accessed by using the first access method but cannot be accessed by using the second access method; uploading scan data in the target area in the first type of storage area by sending an upload command, which includes scan data generated by the scanner, to the data storage server by using the first access method, in a case where it is determined that the target area is an area in the first type of storage area; and informing the user of impossible designation information in a case where it is determined that the target area is an area in the second storage area, the impossible designation information indicating that the target area cannot be designated as an area in which the scan data is to be uploaded.

A control method and computer-readable instructions for implementation of the scanner described above, and a non-transitory computer-readable recording medium in which the computer-readable instructions are stored, are also novel and useful.

BRIEF DESCRIPTION OF DRAWINGS

FIG. 2 shows a flowchart of a process by a scanner;
FIG. 3 shows respective screens to be displayed on a terminal device;
FIG. 4 shows a sequence diagram of a case A in which scan data is uploaded;
and
FIG. 5 shows a sequence diagram of a case B in which impossible designation information or impossible upload information is displayed.

EMBODIMENT

Figure 1:
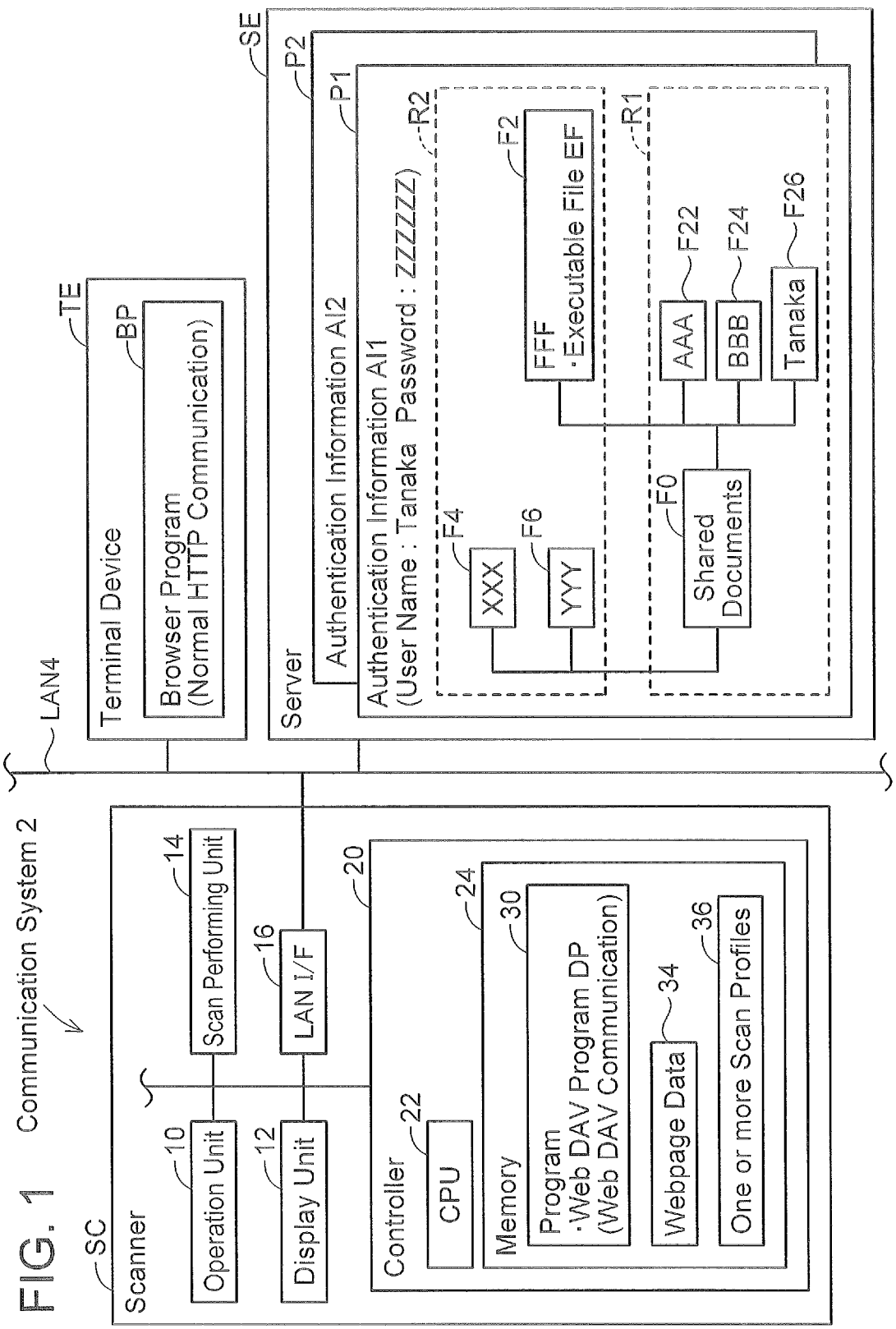
FIG. 1 shows a configuration of a communication system.

Configuration of Communication System 2; FIG. 1

A communication system 2 comprises a scanner SC, a terminal device TE, and a server SE. Each of the devices SC, TE, SE can communicate with each other via a LAN (abbreviation of Local Area Network).

(Configuration of Scanner SC)

The scanner SC is a peripheral having a scanning function (i.e., a peripheral of the terminal device TE and the like). The scanner SC comprises an operation unit 10, a display unit 12, a scan performing unit 14, a LAN interface 16, and a controller 20. Hereinbelow, the interface will be denoted as "I/F".

The operation unit 10 is configured of a plurality of keys. A user can operate the operation unit 10 to input various instructions to the scanner SC. The display unit 12 is a display for displaying various types of information. The scan performing unit 14 is a scanning mechanism such as a CCD, CIS, and the like. The LAN I/F 16 is connected to a LAN 4.

The controller 20 comprises a CPU 22 and a memory 24. The CPU 22 is a processor that executes various processes according to a program 30 stored in the memory 24. The memory 24 is configured of RAM, ROM, and the like. The memory 24 stores not only the program 30 but also webpage data 34 in advance. Further, the memory 24 may store one or more scan profiles 36.

The program 30 includes a basic program for executing a scanning function (not shown), and a WebDAV (abbreviation of Web-based Distributed Authoring and Versioning) program DP that is a program for executing a communication according to a WebDAV protocol. The WebDAV protocol is a protocol according to a HTTP (abbreviation of Hypertext Transfer Protocol), and more specifically, it is an extended protocol of the HTTP. Hereinbelow, the communication according to the WebDAV protocol will be termed a "WebDAV communication".

The webpage data 34 is data representing a webpage. The scanner SC sends the webpage data 34 to a terminal device TE in response to a request from the terminal device TE for example, and can cause the webpage to be displayed in the terminal device TE. That is, the scanner SC functions as a web server.

(Configuration of Terminal Device TE)

The terminal device TE is a publicly known information processing terminal such as a PC (abbreviation of Personal Computer), a smartphone, and the like. The terminal device TE comprises a browser program BP for viewing the webpage. The browser program BP is a program for executing a communication according to the HTTP, instead of a communication according to the WebDAV protocol. Hereinbelow, a communication that is not according to the WebDAV protocol but is according to the HTTP (that is, a normal communication executed by a web browser) will be termed a "normal HTTP communication".

(Configuration of Server SE)

The server SE is a server for storing data, and in the present embodiment, it is a SharePoint (registered trademark) server of Microsoft. The server SE supports both the normal HTTP communication and the WebDAV communication. Due to this, the server SE allows an external device (e.g., scanner SC, terminal device TE) both an access according to the normal HTTP communication and an access according to the WebDAV communication.

As described above, the terminal device TE comprises the browser program BP. Accordingly, the terminal device TE executes the normal HTTP communication according to the browser program BP and can thereby access the server SE. On the other hand, the scanner SC does not comprise a browser program. Thus, the scanner SC can access the server SE by executing a WebDAV communication according to the WebDAV program DP instead of the normal HTTP communication. Notably, a data amount of the WebDAV program DP is less than a data amount of the browser program BP. Further, a memory capacity of the scanner SC is usually small as compared to a memory capacity of the terminal device TE. In view of such a circumstance, in the present embodiment, a configuration in which the scanner SC stores the WebDAV program DP instead of the browser program is employed to suppress a data amount to be stored in the scanner SC having the relatively small memory capacity.

The server SE stores a plurality of personal data P1, P2 corresponding to a plurality of users. Each personal data P1, P2 is an association of authentication information for authenticating a corresponding user, and a plurality of folders (i.e., data in a folder) for the corresponding user. For example, the personal data P1 includes authentication information AI1 and a plurality of folders F0, F2, F4, F6, and the like. Further, the personal data P2 includes authentication information AI2 and a plurality of folders (not shown).

The authentication information AI1 in the personal data P1 includes a user name "Tanaka" and a password "ZZZZZZ". Further, the plurality of folders F0, F2, F4, F6, and the like in the personal data P1 has a hierarchical relation. The folder F0 having a folder name of "Shared Document" is a folder positioned in a highest hierarchical level, and folders F4, F6 having the folder names "XXX", "YYY" are folders positioned in a same hierarchical level.

The folder F0 includes folders F2, F22, F24, F26 as subordinate folders of the folder F0. The folder names of the folders F2, F22, F24, F26 are "FFF", "AAA", "BBB", and "Tanaka", respectively. The folder F2 stores an executable file EF. In the executable file EF, the folder F0 that is a superior folder of the folder F2 including the executable file EF, and each of the subordinate folders F22, F24, F26 of the folder F0 are designated as targets. Hereinbelow, an area including the folders F0, F22, F24, F26 being the targets of the executable file EF will be termed a "first type of storage area R1". Further, the server SE allows an access to uploaded data stored in an access destination folder by executing the executable file EF in a case where the access to one of the folders in the first type of storage area R1 is requested in the normal HTTP communication. That is, the first type of storage area R1 is an area in which uploaded data can be accessed by the external device (e.g., terminal device TE) by using the normal HTTP communication. On the other hand, in the executable file EF, the folder F4 and the folder F6 are not designated as targets. Due to this, the server SE does not execute the executable file EF in a case where an access to the folder F4 or the folder F6 is requested in the normal HTTP communication, as a result of which an access to uploaded data stored in an access destination folder is not allowed. That is, the folder F4 and the folder F6 are folders in which the uploaded data cannot be accessed by the external device (e.g., terminal device TE) by using the normal HTTP communication.

Notably, the folder F2 exists as a subordinate folder of the folder F0, but is a folder of which folder icon (i.e., information indicating the folder name "FFF") indicating the folder F2 is not displayed in the external device when the external device accesses the server SE. That is, the folder F2 is a so-called hidden folder. Similar to the folder F4 and the folder F6, since the folder icon of the folder F2 is not displayed, the folder F2 is a folder in which uploaded data cannot be accessed by the external device using the normal HTTP communication. Hereinbelow, an area including each of the folders F2, F4, F6 in which the uploaded data cannot be accessed by the external device using the normal HTTP communication will be termed a "second type of storage area R2".

Further, the server SE allows access to uploaded data stored in the access destination folder regardless of the executable file EF when a folder is accessed by the WebDAV communication. Accordingly, the first type of storage area R1 is an area in which the data uploaded to the first type of storage area R1 can be accessed by the external device (e.g., terminal device TE) using whichever access methods of the WebDAV communication and the normal HTTP communication. On the other hand, the second type of storage area R2 is an area in which the data uploaded to the second type of storage area R2 can be accessed by the external device using the WebDAV communication but cannot be accessed using the normal HTTP communication.

As described above, in the present embodiment, the folder F2 is a hidden folder. The hidden folder may not have its folder icon not displayed at all times, and for example, it may be a type of which folder icon is displayed when the browser program is used in a special manner for displaying the hidden folder. That is, the hidden folder simply needs to be not displayed in a case where the browser program of the external device is normally used. Notably, in an alternative, the folder F2 may not be a hidden folder.

The scanner SC can execute the WebDAV communication, so the scan data can be uploaded to both the first type of storage area R1 and the second type of storage area R2. The terminal device TE can execute the normal HTTP communication and access the scan data uploaded to the first type of storage area R1. That is, a user can download the scan data, which had been uploaded to the first type of storage area R1, to the terminal device TE, and cause a scan image to be displayed in the scan data in the terminal device TE. On the other hand, when the scan data is uploaded to the second type of storage area R2 (e.g., folder F4), the terminal device TE cannot access the scan data uploaded in the second type of storage area R2 even when the normal HTTP communication is executed. That is, the user cannot cause the scan data uploaded in the second type of storage area R2 to be displayed in the terminal device TE. To prevent an occurrence of such a circumstance, the scanner SC of the present embodiment executes the following process of FIG. 2.

(Process of Scanner SC; FIG. 2)

A process executed by the CPU 22 of the scanner SC will be described with reference to FIG. 2. In S10, the CPU 22 monitors a receipt of a webpage request from the terminal device TE. The webpage request is a HTTP request according to the browser program BP of the terminal device TE, and is a command that requests to send webpage data 34. In a case where the webpage request is to be received from the terminal device TE (YES to S10), the CPU 22 functions as a web server in S12, and sends the webpage data 34 in the memory 24 to the terminal device TE. Due to this, the terminal device TE displays a webpage screen represented by the webpage data 34.

FIG. 3 shows a webpage screen SC3 represented by the webpage data 34. The webpage screen SC3 is a screen for designating a scan profile to be registered in the scanner SC, and includes a plurality of designation areas 120 to 132, a cancel button 140, and a submit button 142. The designation area 120 is an area for designating a profile name that is a name to identify a scan profile. The designation area 122 is an area for designating an address for identifying a folder within the server SE where the scan data should be uploaded (i.e., URL (abbreviation of Uniform Resource Locator)). The designation area 124 is an area for designating a file name that is a name to identify a file including the scan data. The designation area 126 is an area for designating a quality of the scan data, and more specifically, it is an area for designating a number of colors and a scan resolution. The designation area 128 is an area for designating a file format of the scan data. The designation areas 130, 132 are areas for designating authentication information for utilizing the server SE, that is, a user name and a password. Notably, in a case where the cancel button 140 is selected, a cancel request is sent from the terminal device TE to the scanner SC. Further, in a case where the submit button 140 is selected after respective information had been designated in the respective designation areas 120 to 132, a submit request including the respective information as above (i.e., the scan profiles) is sent from the terminal device TE to the scanner SC. Hereinbelow, each scan profile included in the submit request will be termed a "target scan profile".

Here, a method for the user of the terminal device TE to designate a URL in the designation area 122 will be described by reference to server screens SC1, SC2. The user firstly activates the browser program BP and inputs the authentication information AI1 for accessing the server SE (i.e., the user name "Tanaka" and the password "ZZZZZZ") to the terminal device TE. In this case, the terminal device TE executes the normal HTTP communication, receives screen data representing the server screen SC1 that indicates contents of the folder F0 included in the personal data P1 for example from the server SE, and displays the server screen SC1.

The server screen SC1 includes an area 100 indicating the URL of the folder F0, an area 102 indicating the authentication information AI1 an area 104 indicating the folder name "Shared Document" of the folder F0 where the terminal device TE is currently accessing, and an area 106 indicating folder names "AAA" and the like of the respective subordinate folders of the folder F0. Notably, as described above, the folder F2 exists as a subordinate folder of the folder F0 (see FIG. 1), however, the folder F2 is a hidden folder. Thus, the folder name "FFF" of the folder F2 is not described in the area 106. Accordingly, since the folder F2 is a hidden folder, a possibility by which the folder name "FFF" of the folder F2 is changed by the user is low.

The user selects a folder F26 having the folder name "Tanaka" by clicking on the folder name "Tanaka" in the area 106 in the server screen SC1, for example. In this case, the terminal device TE executes the normal HTTP communication to receive screen data representing the server screen SC2 indicating contents of the selected folder F26 from the server SE, and displays the server screen SC2.

The server screen SC2 includes an area 110 indicating the URL of the folder F26, an area 112 indicating the authentication information AI1 an area 114 indicating the folder name "Tanaka" of the folder F26 where the terminal device TE is currently accessing, and an area 116 indicating file names of the respective files included in the folder F26.

In a case where the user wishes to have the scan data uploaded to the folder F26, the user copies the URL described in the area 110 in the server screen SC2 to the designation area 122 in the webpage screen SC3. Due to this, the user can designate the URL in the designation area 122. That is, the user can designate the URL of the upload destination of the scan data.

In S14 of FIG. 2, the CPU 22 determines whether or not a submit request has been received from the terminal device TE. In a case where the submit request has been received from the terminal device TE (YES to S14), the CPU 22 proceeds to S30. On the other hand, in a case where the cancel request has been received from the terminal device TE (NO to S14), the CPU 22 skips the process of S30 and so on, and ends the process of FIG. 2.

In S30, the CPU 22 determines whether or not the URL included in the target scan profile (i.e., the address designated in the designation area 122 of FIG. 3) satisfies a predetermined condition. Hereinbelow, the URL included in the target scan profile will be termed a "target URL". Specifically, in a case where the target URL includes a predetermined character string "FFF", the CPU 22 determines as that the target URL satisfies the predetermined condition (YES to S30) and proceeds to S34, and determines as that the target URL does not satisfy the predetermined condition (NO to S30) and proceeds to S32 in a case where the target URL does not include the predetermined character string "FFF". Here, the predetermined character string "FFF" is the folder name of the folder F2 that stores the executable file EF. As described above, the server SE executes the executable file EF in the case where the access to the folder in the first type of storage area R1 is requested in the normal HTTP communication. Due to this, in a case where the target URL indicates one of the folders F0, F22, F24, F26 in the first type of storage area R1, the target URL includes the folder name "FFF" of the folder F0 that stores the executable file EF. On the other hand, in a case where the target URL indicates the folder F4 or F6 in the second type of storage area R2, the target URL does not include the folder name "FFF" of the folder F0. That is, in S30, the CPU 22 determines whether the target URL indicates a folder in the first type of storage area R1 or a folder in the second type of storage area R2. Notably, in the present embodiment, the folder F2 is a hidden folder, so the target URL indicating the folder F2 is not designated by the user.

In S32, the CPU 22 notifies impossible designation information to the user of the terminal device TE by sending the impossible designation information to the terminal device TE. The impossible designation information is information indicating that the folder indicated by the target URL (e.g., F4) cannot be designated as the folder for uploading the scan data. When S32 ends, the process of FIG. 2 ends. Notably, as described above, since the CPU 22 can execute the WebDAV communication, the scan data can be uploaded to the folder included in the second type of storage area R2 within the server SE. However, in S32, although the scan data can be uploaded to the folder indicated by the target URL, the CPU 22 sends the impossible designation information to the terminal device TE. Further, the CPU 22 does not allow the scan profile included in the submit request to be stored in the memory 24 (i.e., the process of S62 to be described later will not be executed).

In S34, the CPU 22 determines whether or not the target URL is a long URL. The long URL is a URL for accessing a folder within the server SE by using the normal HTTP communication, and is configured of a longer character string than a short URL for accessing a folder within the server SE by using the WebDAV communication. For example, the URL described in the area 110 of FIG. 3 is a long URL. The CPU 22 determines that the target URL is a long URL (YES to S34) in a case where the target URL includes a character string not normally included in a short URL but is included in a long URL (hereinafter termed a "predetermined character string"), and proceeds to S36. The predetermined character string is for example a character string indicating a percent encoding ("%20", "%2F" and the like). On the other hand, the CPU 22 determines that the target URL is not a long URL, that is, the target URL is a short URL (NO to S34) in a case where the target URL does not include the predetermined character string, skips S36 and proceeds to S40.

In S36, the CPU 22 converts the target URL being the long URL into a short URL. Specifically, the CPU 22 converts the character string indicating the percent encoding included in the target URL. For example, the CPU 22 converts "%20" included in the target URL to a half-width space, and converts "%2F" to a slash, or the CPU 22 omits a part of the character string included in the URL. A specific method for converting the long URL to the short URL will be described later with reference to FIG. 4.

In S40, the CPU 22 uses the WebDAV communication to send a connection test request to the server SE. The connection test request includes authentication information in the target scan profile (that is, the user name and the password designated in the designation areas 130, 132 of FIG. 3). The server SE uses the authentication information in the connection test request in a case of receiving the connection test request from the scanner SC to confirm whether or not the scan data can be uploaded to the folder associated with the authentication information. In other words, the server SE confirms whether or not a user authentication according to the authentication information in the connection test request succeeds. Specifically, in a case where personal data including the authentication information in the connection test request is present in the plurality of personal data P1, P2 (see FIG. 1), that is, in a case where it is confirmed that the scan data can be uploaded to the folder associated with the authentication information, the server SE sends a connection test result indicating OK to the scanner SC. On the other hand, in a case where the personal data including the authentication information in the connection test request is not present among the plurality of personal data P1, P2, that is, in a case where it is confirmed that the scan data cannot be uploaded due to the authentication information not being valid, the server SE sends a connection test result indicating NG to the scanner SC In S42, the CPU 22 uses the WebDAV communication to receive a connection test result indicating OK or a connection test result indicating NG from the server SE. Then, in S50, the CPU 22 determines whether or not the connection test result received in S42 indicates OK or not. The CPU 22 proceeds to S60 in a case where the connection test result indicates OK (i.e., YES to S50), and proceeds to S53 in a case where the connection test result indicates NG (i.e., NO to S50).

In S52, the CPU 22 notifies impossible upload information to the user of the terminal device TE by sending the impossible upload information indicating that the scan data cannot be uploaded to the folder indicated by the target URL to the terminal device TE. The impossible upload information includes information indicating a reason why the upload cannot be carried out. In the present embodiment, the impossible upload information includes information indicating that the user authentication has failed. Due to this, the user can for example acknowledge that the user had incorrectly designated the authentication information, for example. When S52 ends, the process of FIG. 2 ends.

In S60, the CPU 22 notifies OK information to the user of the terminal device TE, by sending the OK information indicating that the scan data can be uploaded to the folder indicated by the target URL.

Next, in S62, the CPU 22 causes the target scan profile to be stored (i.e., registered) in the memory 24. Notably, in a case where S36 is carried out, the target scan profile including the converted short URL after the conversion instead of the unconverted long URL before the conversion is stored in the memory 24. Due to this, numbers of characters configuring the URL become less, and data amount to be stored in the memory 24 becomes less. When S62 ends, the process of FIG. 2 ends.

After the target scan profile has been stored in the memory 24 in S62, the CPU 22 executes the following process (not shown) according to the user's instruction. That is, the CPU 22 causes one or more profile names (i.e., information designated in the designation area 120 of FIG. 3) in the one or more scan profiles in the memory 24 to be displayed in the display unit 12. The user selects the profile name of the target scan profile from among the one or more profile names by operating the operation unit 10. Due to this, the CPU 22 receives the selection of the target scan profile.

Next, in a case where a scan execution button included in the operation unit 10 is operated by the user, the CPU 22 causes scan of a document to be performed by the scan performing unit 14 to generate a file including the scan data. Specifically, the CPU 22 firstly instructs the scan performing unit 14 of the quality included in the target scan profile in the memory 24 (i.e., number of colors and scan resolution; see the designation area 126 of FIG. 3), and acquires scan data having the quality from the scan performing unit 14. Then, the CPU 22 generates file information (header information, footer information, and the like) corresponding to the file format included in the target scan profile in the memory 24 (see the designation area 128 of FIG. 3), and generates a file name by adding the current date and time to the file name (see the designation area 124 of FIG. 3) included in the target scan profile in the memory 24 (e.g., image201410081325). Then, the CPU 22 generates a file including the scan data, the file information, and the file name.

Next, the CPU 22 uploads the file to the server SE by using the WebDAV communication by sending the upload command including the generated file to the server SE. More specifically, the CPU 22 sends the upload command that includes the short URL included in the target scan profile in the memory 24 as a sending target URL to the server SE. Due to this, the CPU 22 can upload the file to the folder indicated by the target URL (e.g., the folder having the folder name "Tanaka").

(Specific Cases; FIG. 4, FIG. 5)

Next, contents of specific cases A and B implemented according to the flowchart of FIG. 2 will be described with reference to FIG. 4 and FIG. 5. Firstly, the case A in which the scan data is uploaded will be described with reference to FIG. 4.

(Case A; FIG. 4)

In T10, the terminal device TE executes the normal HTTP communication and sends the webpage request to the scanner SC.

When the webpage request is received from the terminal device TE (YES to S10 in FIG. 2), the scanner SC sends the webpage data 34 to the terminal device TE in T12 (S12).

In T20, the terminal device TE accepts the operation to designate the respective information in the webpage screen SC3 represented by the webpage data 34. In the present case, the user designates the long URL indicating the folder F26 (see FIG. 1) within the server SE as the folder where the scan data is to be uploaded. Further, in T22, the terminal device TE executes the normal HTTP communication to send the submit request including the scan profile SP to the scanner SC.

When the submit request is received from the terminal device TE (YES to S14), this means that the URL in the scan profile SP (i.e., the long URL) include the character string "FFF"; thus, the scanner SC determines that the URL satisfies the predetermined condition in T30 (YES to S30). In T32, since the URL in the scan profile SP includes the character string indicating the percent encoding ("%20", "%2F" and the like), the scanner SC determines that this URL is the long URL (YES to S34), and converts the long URL to the short URL (S36). Details of the URL conversion will be described next.

FIG. 4 shows a specific example of a long URL 200 indicating the folder F26 having the folder name "Tanaka", and a short URL 202 obtained from the long URL 200. The long URL 200 includes the percent encoding ("%20", "%2F" and the like), the folder name "FFF" of the hidden folder storing the executable file EF, and a query string (i.e., character string following "AllItems.aspx?RootFolder="). The query string is a character string for requesting the server SE to execute the executable file EF. Here, "AllItems.aspx" is the file name of the executable file EF. The scanner SC converts the character strings "%20", "%2F" included in the long URL 200 respectively into a space and a slash, and omits the folder name "FFF" of the hidden folder from the long URL. Further, the scanner SC specifies the character string "Tanaka" immediately preceding "&Folder" from within the query string to specify the folder name "Tanaka" of the upload destination folder. The short URL 202 is thereby generated Next, the scanner SC executes the WebDAV communication in T40 to send the connection test request including the authentication information AI1 (i.e., user name "Tanaka" and password "ZZZZZZ") in the scan profile SP to the server SE (S40), and receives the connection test result indicating OK from the server SE in T42 (YES to S50). Then, the scanner SC sends the OK information to the terminal device TE in T50 (S60), and causes the OK information to be displayed in the terminal device TE in T52.

Next, in T60, the scanner SC stores the scan profile SP in the memory 24. Here, the URL in the scan profile SP stored in the memory 24 is the converted short URL 202 after the conversion as obtained in T30.

Thereafter, in T70, the scanner SC accepts a selection of the scan profile SP from among one or more scan profiles 36 in the memory 24. In this case, the scanner SC generates a file FL by executing the scan of the document based on the scan profile SP. Then, in T74, the scanner SC executes the WebDAV communication to send the upload command including the short URL 202 and the file FL to the server SE. As a result of this, in T80, the file FL is stored in the folder F26 indicated by the short URL within the server SE, and the upload of the file FL is thereby completed.

The folder F26 being the upload destination of the file FL is a folder in the first type of storage area R1. Due to this, the terminal device TE can access the file FL in the folder F26 by executing the normal HTTP communication. Specifically, in T90, the terminal device TE displays the server screen SC2 including the file name of the file FL in the case where the folder name "Tanaka" is clicked in the server screen SC1 of FIG. 3, for example. Further, the terminal device TE accepts the selection of the file name of the file FL from the user in the server screen SC2. In this case, the terminal device TE executes the normal HTTP communication in T92 to send a file request to the server SE, and receives (i.e., downloads) the file FL from the server SE in T94. Then, in T96, the terminal device TE displays a scanned image represented by the file FL (i.e., scanned image representing the document scanned by the scanner SC). Due to this, the user can view the scanned image.

(Case B; FIG. 5)

Case B shows a case in which it is determined NO in S30 of FIG. 2, and a case in which it is determined NO in S50 in FIG. 2. Firstly, the former case will be described. In the former case, the processes are identical to T10 to T22 of FIG. 4. However, the scan profile SP includes a URL indicating the folder F4 which is not the folder F26 within the server SE. In this case, the URL in the scan profile SP does not include the predetermined character string "FFF", so in T34, the scanner SC determines that the URL does not satisfy the predetermined condition (NO to S30 of FIG. 2). Then, the scanner SC sends the impossible designation information to the terminal device TE in T36 (S32), and in T38, a screen SC5 indicating the impossible designation information is displayed in the terminal device TE. The screen SC5 includes the impossible designation information indicating that an inappropriate folder had been designated.

Next, the latter case will be described. In the latter case, the processes are identical to T10 to T40 of FIG. 4. However, the scan profile SP includes authentication information in which an incorrect password had been designated (i.e., user name "Tanaka" and password "ZZZZZW"). Accordingly, in T44, the scanner SC receives the connection test result indicating NG from the server SE. Then, the scanner SC sends the impossible upload information to the terminal device TE in T46, and in T48, a screen SC6 indicating the impossible upload information is displayed in the terminal device TE. The screen SC6 includes the impossible upload information that indicates that an inappropriate authentication information had been designated.

(Effects of the Embodiment)

In the present embodiment, the data uploaded to the first type of storage area R1 within the server SE can be accessed by using whichever of the WebDAV communication and the normal HTTP communication. However, the data uploaded to the second type of storage area R2 within the server SE can be accessed by using the WebDAV communication but cannot be accessed by using the normal HTTP communication. In view of the above circumstance, the scanner SC determines whether the designated folder is included in the first type of storage area R1 or is included in the second type of storage area R2 at a stage where the upload destination folder within the server SE is designated by the user. Further, as shown in the case A of FIG. 4, in a case where the URL designated by the user includes the predetermined character string "FFF", that is, in the case where the designated folder is included in the first type of storage area R1, the scanner SC stores the scan profile SP in the memory 24 (T60). As a result of this, the scanner SC uploads the file FL including the scan data to the folder F26 in the first type of storage area R1 in the case where the scan profile SP in the memory 24 is selected by the user (T74). Accordingly, the user can appropriately access the scan data from the terminal device TE by using the normal HTTP communication.

Further, in the present embodiment, the scanner SC uses the folder name of the hidden folder, which is a folder name that is always included in the case of designating a folder in the first type of storage area R1 as the predetermined character string "FFF" of the determination target. Due to this, the scanner SC can appropriately enhance the user to appropriately designate the folder in the first type of storage area R1 as the upload destination folder of the scan data. Further, the scanner SC determines whether or not the predetermined character string "FFF" is included in the long URL before it is converted into the short URL. Due to this, the scanner SC can appropriately determine and perform the execution even with the character string "FFF" that would not be included in the short URL by the conversion from the long URL into the short URL.

On the other hand, if a file including scan data is uploaded to a folder in the second type of storage area R2, the user cannot access the scan data from the terminal device TE using the normal HTTP communication. Thus, as shown in case B of FIG. 5, the scanner SC notifies the impossible designation information to the user in the case where the designated folder is included in the second type of storage area R2 (T36). Then, in this case, since the scan profile SP is not stored in the memory 24, a file including the scan data is prohibited from being uploaded to a folder in the second type of storage area R2. As a result of this, a phenomenon in which the user cannot access the scan data uploaded within the server SE can be prevented from occurring.

Further, in the present embodiment, the scanner SC can send the webpage data 34 to the terminal device TE by functioning as a web server (S12 in FIG. 2). Due to this, the user of the terminal device TE can access the server SE by using the browser program BP, copy the URL of the scan data upload destination, and easily input the URL to the webpage screen SC3. Further, the scanner SC executes the connection test before registering the scan profile (S40 and S42), and does not register the scan profile in the case where the connection test result indicates NG (NO to S50). Due to this, a scan profile that cannot be used in uploading the scan data can be prevented from being registered. In other words, a phenomenon in which the scan data upload cannot be executed due to a connection error with the server SE can be prevented from occurring.

(Correspondence Relationship)

The server SE is an example of a "data storage server". The WebDAV communication and the normal HTTP communication are respectively examples of a "first access method" and a "second access method". In FIG. 4, the long URL 200 and the short URL 202 are respectively examples of "first location information" and "second location information". The scan profile SP including the short URL 202 stored in T60 is an example of "relation information". The folder F2 is an example of a "storage folder". The folder name "FFF" of the folder F2 is an example of a "predetermined character string".

(Modification 1) In the above embodiment, the server SE realized by the SharePoint (registered trademark) is an example of a "data storage server". However, the "data storage server" may be any server other than the SharePoint (registered trademark) server, so long as it is a server that stores a folder (e.g., F2) that can be accessed regardless of the access method and a folder (e.g., F4) that cannot be accessed by using the particular access method (e.g., normal HTTP communication).

(Modification 2) In the above embodiment, the WebDAV communication and the normal HTTP communication were exemplified as the methods for accessing the server SE, however, other methods may be utilized. For example, the server SE may store a folder that can be accessed by using whichever of a FTP (abbreviation of File Transfer Protocol) communication and the normal HTTP communication, and a folder that can be accessed only by using the FTP communication (i.e., a folder that cannot be accessed by using the normal HTTP communication). In this case, in the above embodiment, the FTP communication may be utilized in place of the WebDAV communication, and in the present modification, the FTP communication and the normal HTTP communication are respectively examples of the "first access method" and the "second access method". Further, for example, the server SE may store a folder that can be accessed by using whichever of the FTP communication and the normal HTTP communication, and a folder that can be accessed only by using the HTTP communication (i.e., a folder that cannot be accessed by using the normal FTP communication). In this case, in the above embodiment, the FTP communication may be utilized in place of the WebDAV communication, and in the present modification, the normal HTTP communication and the FTP communication are respectively examples of the "first access method" and the "second access method". Further, in another modification, the WebDAV communication and the FTP communication may respectively be examples of the "first access method" and the "second access method".

(Modification 3) The folder name of the executable file storage folder F2 that stores the executable file EF is not limited to the character string "FFF", and may be other character string. Further, the predetermined character string does not have to be a folder name, but may be a file name for example of the executable file EF. That is, the predetermined character string simply needs to be a character string that is included in the location information upon designating the first type of storage area, and that is not included in the location information upon designating the second type of storage area.

(Modification 4) S34 and S36 of FIG. 2 may be omitted. That is, "converting the first location information" may not be performed. In this case, in S62, the scan profile including the long URL may be stored in the memory 24. In the present modification, the scan profile including the long URL is an example of the "relation information".

(Modification 5) In the above embodiment, the scanner SC sends the webpage data 34 to the terminal device TE by functioning as the web server (S12 of FIG. 2). However, data that represents a screen for designating the scan profile does not have to be sent from the scanner SC to the terminal device TE, and may be sent to the terminal device TE from another device (e.g., server on the Internet). In the present modification, the "memory" does not have to store the webpage data. Further, "sending the webpage data" and "receiving the location information" may be omitted.

(Modification 6) S40, S50, S52, and S60 of FIG. 2 may be omitted.

(Modification 7) The CPU 22 may execute the following process between S36 and S40 of FIG. 2. That is, the CPU 22 may send the impossible designation information to the terminal device TE in a case where the short URL obtained in S36 is equal to or more than a predetermined number of characters. Due to this, a scan profile including the short URL configured of a large number of characters is prohibited from being stored in the memory 24, so the data amount stored in the memory 24 can be prevented from becoming large. Further, in a case where the short URL cannot be generated due to some reason, the CPU 22 may send the impossible designation information to the terminal device TE in S32. Due to this, the scan profile is prevented from being stored in the memory 24 when the scan data cannot be uploaded due to the incapability to generate a short URL.

(Modification 8) A "scanner" may be a multi-function device that is provided with a printing function, copying function, facsimile function and the like in addition to the scanning function.

(Modification 9) In each of the above embodiments, the respective processes of FIG. 2, FIG. 4, and FIG. 5 are executed by the CPU 22 of the scanner SC executing processes in accordance with the program 30 (i.e., software). As an alternative to this, at least a part of the respective processes may be realized by hardware such as a logic circuit and the like.

What is claimed is:

1. A scanner comprising:
   a processor; and
   a memory that stores computer-readable instructions therein, the computer-readable instructions, when executed by the processor, causing the scanner to perform:
   determining by using first location information, in a case where the first location information indicating a target area within a data storage server is designated by a user, whether the target area is an area in a first type of storage area or an area in a second type of storage area different from the first type of storage area, the first type of storage area being a storage area in which data uploaded in the storage area can be accessed by using whichever of a first access method and a second access method being different from the first access method, and the second type of storage area being a storage area in which data uploaded in the storage area can be accessed by using the first access method but cannot be accessed by using the second access method;
   uploading scan data in the target area in the first type of storage area by sending an upload command, which includes scan data generated by the scanner, to the data storage server by using the first access method, in a case where it is determined that the target area is an area in the first type of storage area; and
   informing the user of impossible designation information in a case where it is determined that the target area is an area in the second storage area, the impossible designation information indicating that the target area cannot be designated as an area in which the scan data is to be uploaded.

2. The scanner as in claim 1, wherein
   the determining includes:
   determining that the target area is an area in the first storage area in a case where the first location information includes a predetermined character string; and
   determining that the target area is an area in the second storage area in a case where the first location information does not include the predetermined character string.

3. The scanner as in claim 2, wherein
   the predetermined character string includes a folder name indicating a storage folder that stores a predetermined executable file.

4. The scanner as in claim 3, wherein
   the storage folder is a folder for which a folder icon representing the storage folder is not displayed on an external device different from the data storage server in a case where the data storage server is accessed from the external device.

5. The scanner as in claim 1, wherein
   the computer-readable instructions, when executed by the processor, cause the scanner to further perform:
   converting the first location information to second location information in a case where the first location information is for accessing the target area by using the second access method, the second location information being for accessing the target area by using the first access method,
   wherein the uploading of the scan data is performed in the case where it is determined that the target area is an area in the first type of storage area, by sending the upload command, which includes the scan data and the second location information, to the data storage server by using the first access method.

6. The scanner as in claim 5, wherein
   the number of characters of the second location information is less than the number of characters of the first location information.

7. The scanner as in claim 5, wherein
   the determining includes:
   determining that the target area is an area in the first type of storage area in a case where the first location information, which is location information before the converting, includes a predetermined character string; and
   determining that the target area is an area in the second type of storage area in a case where the first location information, which is location information before the converting, does not include the predetermined character string.

8. The scanner as in claim 5, wherein
   the computer-readable instructions, when executed by the processor, cause the scanner to further perform:
   sending data to the data storage server by using the first access method and the second location information being location information after the converting, in the case where it is determined, by using the first location information being location information before the converting, that the target area is an area in the first type of storage area;
   determining whether the scan data can be uploaded to the target area indicated by the second location information according to a result of the sending of the data; and informing the user of impossible upload information in a case where it is determined that the scan data cannot be uploaded to the target area, the impossible upload information indicating that the scan data cannot be uploaded to the target area, wherein the uploading of the scan data is performed in a case where it is determined that the scan data can be uploaded to the target area.

9. The scanner as in claim 1, wherein the computer-readable instructions, when executed by the processor, cause the scanner to further perform:

sending data to the data storage server by using the first access method in the case where it is determined that the target area is an area in the first type of storage area;

determining whether the scan data can be uploaded to the target area according to a result of the sending of the data; and informing the user of impossible upload information in a case where it is determined that the scan data cannot be uploaded to the target area, the impossible upload information indicating that the scan data cannot be uploaded to the target area, wherein the uploading of the scan data is performed in a case where it is determined that the scan data can be uploaded to the target area.

10. The scanner as in claim 1, wherein the computer-readable instructions, when executed by the processor, cause the scanner to further perform:

storing relation information relating to the target area in the memory in the case where it is determined that the target area is an area in the first type of storage area, wherein the relation information is not stored in the memory in the case where it is determined that the target area is an area in the second type of storage area, wherein the uploading of the scan data is performed in a case where the relation information in the memory is designated by the user.

11. The scanner as in claim 10, wherein the memory preliminarily stores webpage data representing a webpage for designating location information in the data storage sever, the computer-readable instructions, when executed by the processor, cause the scanner to further perform:

sending the webpage data in the memory to a terminal device in response to a request from the terminal device; and receiving the first location information from the terminal device in a case where the first location information is designated by the user in the webpage displayed on the terminal device, and the determining is performed in a case where the first location information is received from the terminal device.

12. The scanner as in claim 1, wherein the first access method is an access method according to Web-Based Distributed Authoring and Versioning (WebDAV) protocol, and the second access method is an access method according to Hyper Text Transfer Protocol (HTTP) and not according to the WebDAV protocol.

13. The scanner as in claim 1, wherein the data storage server is a SharePoint (registered trademark) server.

14. A non-transitory computer-readable recording medium storing computer-readable instructions for a scanner, the computer-readable instructions, when executed by a processor of the scanner, causing the scanner to perform:

determining by using first location information, in a case where the first location information indicating a target area within a data storage server is designated by a user, whether the target area is an area in a first type of storage area or an area in a second type of storage area different from the first type of storage area, the first type of storage area being a storage area in which data uploaded in the storage area can be accessed by using whichever of a first access method and a second access method being different from the first access method, and the second type of storage area being a storage area in which data uploaded in the storage area can be accessed by using the first access method but cannot be accessed by using the second access method;

uploading scan data in the target area in the first type of storage area by sending an upload command, which includes scan data generated by the scanner, to the data storage server by using the first access method, in a case where it is determined that the target area is an area in the first type of storage area; and informing the user of impossible designation information in a case where it is determined that the target area is an area in the second storage area, the impossible designation information indicating that the target area cannot be designated as an area in which the scan data is to be uploaded.

* * * * *

UNITED STATES PATENT AND TRADEMARK OFFICE
CERTIFICATE OF CORRECTION

| | | |
|---|---|---|
| PATENT NO. | : 9,531,905 B2 | |
| APPLICATION NO. | : 14/936304 | |
| DATED | : December 27, 2016 | |
| INVENTOR(S) | : Satoshi Tanaka | |

It is certified that error appears in the above-identified patent and that said Letters Patent is hereby corrected as shown below:

On the Title Page

Please amend the title of the application to read as follows:
"SCANNER CAPABLE OF UPLOADING SCAN DATA IN A TARGET AREA WITHIN A DATA STORAGE SERVER"

Signed and Sealed this
Eighth Day of August, 2017

Joseph Matal
*Performing the Functions and Duties of the*
*Under Secretary of Commerce for Intellectual Property and*
*Director of the United States Patent and Trademark Office*